United States Patent Office 3,686,136
Patented Aug. 22, 1972

3,686,136
OLEFIN DISPROPORTIONATION
Gerald Doyle, Somerville, N.J., assignor to
Esso Research and Engineering Co.
No Drawing. Filed Oct. 1, 1969, Ser. No. 862,970
Int. Cl. C07c 3/62
U.S. Cl. 252—429 B    18 Claims

ABSTRACT OF THE DISCLOSURE

A novel catalyst is manufactured by the reaction of a metallic composition having the formula $R[M(CO)_5X]$ wherein R is selected from the group consisting of alkali metal ions and cations of the type $J_4Q$ wherein Q is selected from the group consisting of nitrogen, phosphorous and arsenic, and J is selected from the group consisting of hydrogen and $C_1$-$C_{30}$ hydrocarbyl radicals, M is a Group VI-B metal and X is a uninegatively charged ligand, selected from the group consisting of halide, cyanide, cyanate, thiocyanate, azide, acetate, trifluoroacetate and stearate, with an activator, said activator consisting essentially of an organometallic compound, said organometallic compound selected from the group consisting of compounds having the general formula $r_nLY_m$ wherein r is independently selected from the group consisting of $C_1$ to $C_{30}$ hydrocarbyl radicals, L is selected from the group consisting of Group I-A, II-A and III-A metals, said metals having an atomic number of from 3 to 31, Y is a halide, n is an integer of from 1 to 3, and m is an integer of from 0 to 3, n and m having a total equal to the valence of L, at a temperature of from about $-100$ to $+150°$ C. and a pressure of between 0.1 and 1,000 atmospheres, the molar ratio of organometallic compound to metallic composition varying between 0.5:1 and 50:1, whereby a catalyst is formed.

BACKGROUND OF THE INVENTION

This invention relates to a novel process for producing a unique ionic catalyst, said catalyst being especially effective for the disproportionation of olefins.

The disproportionation of olefins refers to those reactions in which one or more olefinic compounds are transformed into other olefins of different molecular weights. The reaction can be regarded as consisting of the breaking of the double bonds of the reacting olefins and the recombination of the resulting fragments in such a manner that new olefinic products will result.

In the past a variety of catalysts had been known for this purpose. Typical of such catalysts is a catalyst comprising a VI-B metal complex represented by the formula $[(L)_aM_b Z_c]_x$ wherein each (L) is a CO, $R_3Q$, $R_3QO$, $P_2Q$—$QR_2$ or $R^2(COO)_m$ ligand, each Z is a halogen or CN, SCN, OCN, or $SnCl_3$ radical; M is Mo, W, MoO, $MoO_2$, WO, $WO_2$ preferably Mo or W; Q is phosphorous, arsenic, or antimony; $a$ is 1–6, $b$ is 1–2, generally 1 $c$ is 0–5, and the number of (L) and Z groups present in the complex is not greater than the number required for the metal to achieve the closed shell electronic configuration of the next higher atomic number inert gas; $x$ is a number, generally 1, representing the polymeric state of the complex; R is an aromatic or saturated aliphatic hydrocarbon radical, including alkoxy and halo derivatives thereof, having up to 20 carbon atoms; $m$ is 1 or 2; $R^2$ is an aromatic, saturated aliphatic, or ethylenically unsaturated hydrocarbon radical having up to 30 carbon atoms, $R^2$ being monovalent when $m$ is 1 and divalent when $m$ is 2; with an organometallic reducing agent.

Variations on the above catalyst are also known in which Group VII metals are utilized as well as Group VIII metals. Although these catalysts have proven to be somewhat successful in the disproportionation of olefins their acceptance has been hindered somewhat by the great expense associated with their production. In addition, many of these catalysts have not shown great activity particularly at lower temperatures, i.e. tempeartures in the range of $-25$ to $40°$ C.

Heterogeneous catalysts which have been utilized for olefin disproportionation in the past have had only limited success as indicated by their relatively low activities and selectivities and the requirement that the reactions must be carried out in the vapor state.

SUMMARY OF THE INVENTION

According to this invention it has unexpectedly been found that catalysts having the general formula $$R[M(CO)_5X]$$

when reacted with an organometallic compound of a Group I to III metal, preferably a I-A, II-A, or III-A metal halide produce an extremely effective catalyst, especially for olefin disproportionation.

In the above formula R is a suitable cation chosen from any of several unipositive cations, usually a tetraalkyl or aryl substituted Group V element. M is a Group VI-B metal and X is a uninegatively charged ligand such as a halide or a pseudohalide.

The contacting between the Group VI-B metal compound and the organometallic compound may take place at temperatures which range from below ambient to elevated and pressures which would vary from subatmospheric to superatmospheric. The reaction should take place in a solvent, preferably an inert solvent; or in the reacting olefin itself as a solvent; modifiers may be added to the catalyst mixture to alter the type of reaction, reaction rate or selectivity of the reaction. Typical modifiers would include the various Lewis bases.

In more detail the instant invention pertains to a novel catalyst, means for preparing said catalyst and the use of such catalysts in the disproportionation reaction.

To produce the catalyst of the instant invention, one must make use of the reaction product of a Group VI-B metal species of the type $R[M(CO)_5X]$ with one or several organo metallic compound having the general formula $r_nLY_m$. In the above formulae R is a unipositive cation.

Generic examples of such cations include the following:

(1) Alkali metal ions such as Li, Na or K
(2) Cations of the general type $J_4Q^+$ where Q is a Group V element such as nitrogen phosphorous, arsenic and the like and J can be either hydrogen or an aromatic, saturated aliphatic or unsaturated hydrocarbon radical having up to 30 carbon atoms. The four J radicals need not be identical but is preferably tetraphenyl or a $C_1$ to $C_6$ alkyl group. Typical examples of such cations are as follows:

tetrabutylammonium Cs+
tetraphenylphosphonium K+
tetraphenylarsonium Na+
methyltriphenylphosphonium
triphenylmethylammonium
pyridinium
benzyltrimethylphosphonium
tetra(n-propyl)ammonium
tetraphenylstibonium
tetradecylammonium M is a Group VI-B metal and would thus have to be selected from Cr, Mo, or W, X may be any uninegatively charged ligand but is preferably a halide such as chlorine or a pseudohalide. Examples of such pseudohalides include cyanide, cyanate, thiocyanate, and azide. Other uninegatively charged ligands which may be utilized are carboxylate groups such as acetate, trifluoroacetate, stearate, etc.

The organometallic derivative compounds would include organometallic halides, hydrides, alkoxides and the like. Consequently, L, the metallic element, may be selected from Group I, Group II, or Group III metals more preferably the Group I-A, II-A, or III-A metals of atomic number 3 to 31; the most desirable element for N is aluminum. Further, r may be any aromatic or aliphatic radical including halide, alkoxy and similar derivatives or hydrogen, Y is a halide or pseudohalide, n is an integer of from 1 to 3, m is an integer of from 0 to 3 and their total is equal to the valence of L. More specifically, r may be substituted or unsubstituted, saturated or unsaturated, but should preferably be hydrocarbyl in nature and more preferably still would be a $C_1$ to $C_{30}$ hydrocarbyl. Thus, the general category of alkyl, aryl, alkaryl, aralkyl, cycloalkyl and cycloalkenyl would be included. Alkyl groupings of $C_1$ to $C_{30}$ are especially satisfactory, as are aryl groupings of $C_6$ to $C_{20}$, alkaryl groupings of $C_7$ to $C_{20}$ and aralkyl groupings of $C_7$ to $C_{20}$. The cyclic groupings, both cycloalkyl and cycloalkenyl are preferred when they have 3 to 15 carbons. The above groupings would include for example, methyl, ethyl, n-propyl, isopropyl, isobutyl, secondary-butyl, tert-butyl, n-amyl, isoamyl, heptyl, n-octyl, n-dodecyl, and the like; 2-butenyl, and the like, cyclopentyl-methyl, cyclohexyl-ethyl, cyclohexylpropyl, and the like; 2-phenyl ethyl, 2-phenyl propyl, 2-naphthyl ethyl, methyl naphthyl ethyl, and the like; cyclopentyl, cyclohexyl, 2,2,1-bicycloheptyl, and the like; methyl cyclopentyl, dimethyl cyclopentyl, ethyl cyclopentyl, methyl cyclohexyl, dimethyl cyclohexyl, 5-cyclopentadienyl, and the like; phenyl cyclopentyl, and the like; phenyl, tolyl, xylyl, ethyl phenyl, naphthyl, cyclohexyl phenyl, and the like. In general, the r group can contain up to about 20 carbon atoms and L may be selected from such metals as lithium, magnesium, calcium, strontium, zinc, cadmium, boron, and aluminum.

Preferred organometallic compounds are aluminum derivatives of the formula $R'AlY_2$ wherein R' is selected from the group consisting of hydrogen and $C_1$–$C_{20}$ hydrocarbyl radicals, including oxyhydrocarbyls, e.g. alkoxides, preferably alkyl radicals, wherein at least one R' is a hydrocarbyl radical; and Y is a halide. More preferably alkylaluminum halides are employed as the activating agent. Alkyl radicals of 1–12 carbon atoms are most preferred. The preferred halides are Cl or Br with Cl being the most preferred. Thus, compounds such as methylaluminum dichloride, ethylaluminum dichloride, methylaluminum sesquichloride, etc. may be employed. The most preferred compound, which appears to give the best catalyst is, however, methylaluminum dichloride. It is particularly important that these organometallic compounds be substantially and preferably completely, free of water since water can cause hydrolysis of the organometallic compounds, thereby inhibiting or destroying its activating potential.

In some instances Lewis acids such as $AlY_3$ wherein Y is a halide may be used in place of the organometallic derivative.

The two compounds, the Group VI-B metal and the organometallic are reacted at a temperature of about $-100$ to $+150°$ C., preferably $-50$ to $+100°$ C., and most preferably $0°$ to $50°$ C. Pressure may vary between 0.1 and 1000 atm., preferably 0.5 and 200 atm. and most preferably 1 and 100 atm. The reactants are in the liquid phase. The ratio of organometallic compound to Group VI-B metal compound may be varied between 0.5:1 and 50:1 on a mole basis, preferably 1:1 to 15:1 on a mole basis and most preferably 2:1 to 8:1. Contacting time for the reaction may vary between 1 min. and several days preferably 0.1 and 48 hours and most preferably 0.2 to 24 hours.

The reaction proceeds most effectively within a solvent or the reacting olefin itself may act as a solvent; the solvent should be inert in nature and is preferably organic. Typical solvents which may be utilized are $C_1$ to $C_{15}$ alkanes, $C_6$ to $C_{20}$ aryls, $C_1$ to $C_{10}$ halo alkanes such as methyl chloride, $C_6$ to $C_{15}$ haloaryls, and certain haloalkenes which have a halogen substituted on the double bond. Examples of solvents which may be used include pentane, hexane, decane, benzene, xylene, carbon tetrachloride, dichloromethane, chlorobenzene, bromobenzene, tetrachloroethylene, trichloroethylene, etc.

Following the formation of the catalyst, suitable olefins may be added directly in order to commence the disproportionation reaction. The catalyst may be generated in the presence of the reacting olefins.

The catalyst may also be deposited on an inert solid support such as silica or alumina.

The basic formula for the homo disproportionation of an olefin is as follows:

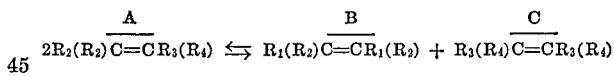

$$2R_2(R_2)C=CR_3(R_4) \leftrightarrows R_1(R_2)C=CR_1(R_2) + R_3(R_4)C=CR_3(R_4)$$

In the above reaction $R_1$, $R_2$, $R_3$ and $R_4$ may be selected from the group consisting of $C_1$ to $C_{10}$ alkyl, aryl, alkenyl, alkaryl, aralkyl, cycloalkyl, cycloalkenyl or hydrogen. Additionally, halogenated derivatives of any of the preceding compounds may also be utilized provided that the halogen is more than two carbon atoms removed from the double bond; at least one of the group consisting of $R_1$, $R_2$, and $R_3$ and $R_4$ is an aryl radical or an $R'$—$CH_2$ radical wherein R' is an alkyl, aryl, alkenyl, alkaryl, aralkyl, cycloalkyl or cycloalkenyl radical or a hydrogen atom. Halogenated derivatives of any of the aforesaid radicals may be utilized providing that the halogen is greater than 2 carbons removed from the double bond.

More particularly, $R_1$, $R_2$, $R_3$ and $R_4$ may be selected from the group consisting of $C_1$ to $C_{20}$ alkyl, $C_6$ to $C_{20}$ aryl aryl including those aryls in which two aromatic rings are condensed, $C_2$ to $C_{30}$ alkenyl but not conjugated dienes, $C_7$ to $C_{20}$ alkaryls, $C_7$ to $C_{20}$ aralkyl, $C_3$ to $C_{20}$ cycloalkyl, $C_3$ to $C_{20}$ cycloalkenyl radicals provided that there are no conjugated double bonds within the cyclo alkenyl radicals or a hydrogen atom. Again, halogenated derivatives, preferably chlorine, of the previously mentioned radicals may be utilized providing the chlorine or halogen utilized is more than two carbons removed from the double bond.

As previously mentioned, at least one of the said $R_1$, $R_2$, $R_3$ and $R_4$ must be an aryl radical or an $R'$—$CH_2$ radical wherein R' is a $C_1$ to $C_{30}$ alkyl, a $C_6$ to $C_{20}$ aryl, a $C_2$ to $C_{20}$ alkenyl, $C_7$ to $C_{20}$ alkaryl, a $C_7$ to $C_{20}$ aralkyl, a $C_3$ to $C_{20}$ cycloalkyl or a $C_3$ to $C_{20}$ cycloalkenyl or a hydrogen atom. The most preferred values for $R_1$, $R_2$, $R_3$, and $R_4$ are $C_1$ to $C_{20}$ alkyls, $C_6$ to $C_{20}$ aryls and $C_2$ to $C_{20}$ alkenyls and hydrogen provided that at least one of said $R_1$, $R_2$, $R_3$, and $R_4$ is an aryl radical or an $R'CH_2$ radical or an $R'$ is a $C_1$ to $C_{20}$ alkyl, $C_6$ to $C_{20}$ aryl, and $C_2$ to $C_{20}$ alkenyl and hydrogen. Additionally, the catalyst of the instant invention is useful for cross disproportionation; by cross disproportionation it is meant those reactions in which a mixture of two different olefins is reacted to form at least one olefinic product. At least one of the products obtained is different of either of the reactants. The general concept of cross disproportionation is illustrated by the following formula:

$R_1(R_2)C=C(R_3)R_4 + R_5(R_6)C=C(R_7)R_8 \rightleftarrows$
$R_1(R_2)C=C(R_7)R_8 + R_1(R_2)C=C(R_6)R_5 +$
$R_4(R_3)C=C(R_7)R_8 + R_4(R_3)C=(R_6)R_5$ Indicative of the homo disproportionation reaction and the products produced is the following table.

The transformation of one or more cyclic mono- or polyolefins in such a manner that a new cyclic polyene of higher molecular weight is produced. A general equation for such a reaction would be

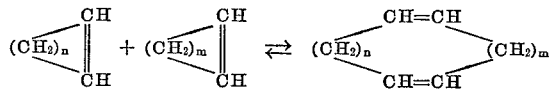

In this case $n$ and $m$ are integers which may vary from 2 to 30 and they may either be the same or different. It is understood that in this reaction the products may react further in a similar manner to form materials of higher molecular weight.

The transformation of one or more acyclic polyolefins so as to form cyclic mono- or polyolefins and acyclic

TABLE

| Reactant: A | Products B | C |
|---|---|---|
| $2\ R_1(R_2)C=CR_3(R_4)$ | $R_1(R_2)C=CR_1(R_2)$ | $+\ R_3(R_4)C=CR_3(R_4)$ |
| $CH_3CH_2CH_2CH=CH_2$ | $CH_3CH_2CH_2CH=CHCH_2CH_2CH_3$ | $+\ CH_2=CH_2$ |
| $CH_3(CH_2)_{17}CH=CH_2$ | $CH_3(CH_2)_{17}CH=CH(CH_2)_{17}CH_3$ | $+\ CH_2=CH_2$ |
| $CH_3CH_2CH=CHCH_3$ | $CH_3CH_2CH=CHCH_2CH_3$ | $+\ CH_3CH=CHCH_3$ |
| $C_6H_5CH_2CH_2CH=CH_2$ | $C_6H_5CH_2CH_2CH=CHCH_2CH_2C_6H_5$ | $+\ CH_2=CH_2$ |
| $ClCH_2CH_2CH_2CH_2CH=CH_2$ | $ClCH_2CH_2CH_2CH_2CH=CHCH_2CH_2CH_2Cl$ | $+\ CH_2=CH_2$ |
| 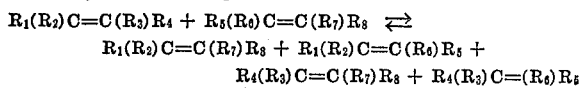 | | $+\ CH_2=CH_2$ |
| $CH_3CH_2\overset{\underset{\mid}{CH_3}}{C}=CHCH_2CH_2CH_3$ | $CH_2CH_2(CH_3)C=C(CH_3)CH_2CH_3$ | $+\ CH_3CH_2CH_2CH=CHCH_2CH_2CH_3$ |
| $CH_2=CHCH_2CH=CH_2$ | $CH_2=CHCH_2CH=CHCH_2CH=CH_2$ | $+\ CH_2=CH_2$ |
| 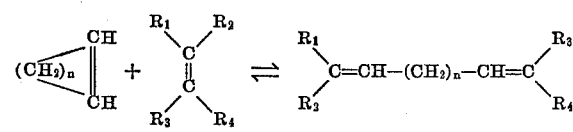 | | $+\ CH_2=CH_2$ |

Other disproportionation reactions of the instant invention include the following:

The transformation of a mixture of an acyclic mono- or polyolefin and a cyclic mono or polyolefin in such a way as to form a new acyclic polyolefin of higher molecular weight than the starting materials. A general equation for such a reaction would be

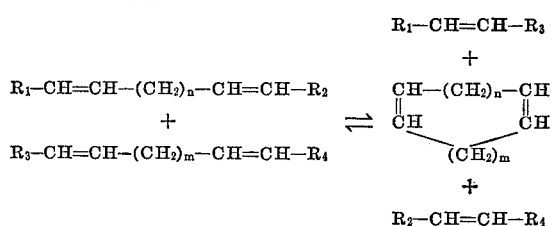

In this case $n$ is an integer varying from 2 to 30. The reverse of this reaction may also be carried out; thus one may employ an acyclic polyefin as a starting material and can obtain a cyclic mono or polyolefin and an acyclic mono or polyolefin of lesser molecular weight than the starting material as products.

mono- or polyolefins. A general equation for such a reaction would be:

$R_1-CH=CH-(CH_2)_n-CH=CH-R_2$
$+$
$R_3-CH=CH-(CH_2)_m-CH=CH-R_4$
$\rightleftarrows$ $R_1-CH=CH-R_3$
$+$
$\underset{CH}{\overset{CH-(CH_2)_n-CH}{\|}}\ \underset{(CH_2)_m}{\overset{\|}{CH}}$
$+$
$R_2-CH=CH-R_4$ In this case $n$ and $m$ are integers and may vary from 1 to 20 and may be either the same or different from each other.

In the above equations $R_1$ through $R_4$ are selected from the group consisting of alkyl, aryl, alkenyl, alkaryl, aralkyl, cycloalkyl, cycloalkenyl, halogen derivatives of the aforesaid and hydrogen. It is preferred that $R_1$ through $R_4$ be selected from the group consisting of $C_1$ through $C_{20}$ alkyl, $C_6$ to $C_{20}$ aryl, $C_2$ to $C_{20}$ alkenyl, $C_7$–$C_{20}$ alkaryl, $C_7$ to $C_{20}$ aralkyl, $C_3$ to $C_{20}$ cycloalkyl and $C_3$ to $C_{20}$ cycloalkenyl, halogen derivatives thereof, preferably chlorine.

Typical reactants and products which illustrate the preceding reactions are as follows: 10:1 to 10,000:1 on a molar basis may be used with preferred ratios of from 100:1 to 1000:1.

TABLE

| Reactants | Products |
|---|---|
| $CH_3CH_2CH_2CH=CHCH_2CH_2CH_3 + CH_3CH=CHCH_3$ | $CH_3CH_2CH_2CH=CHCH_3$ |
| $CH_3CH_2CH=CH_2 + CH_3CH_2CH_2CH=CHCH_3$ | $CH_3CH=CH_2 + CH_3CH_2CH_2CH=CH_2 + CH_3CH_2CH=CHCH_3 + CH_3CH_2CH_2CH=CHCH_2CH_3$ |
| ⬡—$CH=CH_2$ + $CH_3CH=CHCH_3$ | ⬡—$CH=CH—CH_3$ + $CH_2=CHCH_3$ |
| ⬡—$CH_2CH=CH_2$ + $CH_3CH=CHCH_3$ | ⬡—$CH_2CH=CHCH_3$ + $CH_2=CHCH_3$ |
| $CH_3\underset{|}{C}=CH—CH_2—\underset{|}{\overset{CH_3}{C}}—CH_3 + CH_3CH=CHCH_3$ with $CH_3$ above | $CH_3—\underset{|}{\overset{CH_3}{C}}=CHCH_3 + CH_3CH=CH—CH_3—\underset{|}{\overset{CH_3}{C}}—CH_3$ |
| $CH_2=CHCH_2CH_2CH=CH_2 + CH_3CH_2CH_2CH=CH_2$ | $CH_2=CHCH_2CH_2CH=CHCH_2CH_2CH_3 + CH_2=CH_2$ |
| $ClCH_2CH_2CH_2CH=CH_2 + CH_3CH=CHCH_3$ | $ClCH_2CH_2CH_2CH=CHCH_3 + CH_2=CHCH_3$ |
|  + $CH_2=CH_2$ | $CH_2=CHCH_2CH_2CH_2CH_2CH=CH_2$ |
|  + $CH_3CH=CHCH_2CH_3$ | $CH_3CH=CH—CH_2CH_2CH_2CH=CHCH_2CH_3$ |
|  + $CH_2=CH_2$ | $CH_2=CHCH_2CH_2CH=CH_2$ |
| $CH_2=CHCH_2CH_2CH_2CH_2CH=CH_2$ |  + $CH_2=CH_2$ |
| $CH_2=CHCH_2CH=CHCH_2CH=CH_2$ |  + $CH_2=CH_2$ |
| $CH_2=CHCH_2\underset{|}{\overset{CH_3}{C}}H—CH_2CH_2—CH=CHCH_3$ | $CH_3—$ + $CH_2=CHCH_3$ |
|  |  $n \geq 2$ |
|  |  $n \geq 2$ |
| $CH_2=CHCH_2CH_2CH=CH_2$ |  + $CH_2=CH_2$ |

Reaction conditions in the above reactions are substantially identical to the reaction conditions utilized to form the Group VI-B organometallic catalyst of the instant invention. That is to say, the reactants are contacted at temperatures of −100 to +150° C., preferably 0° to 50° C. at pressures which may range from 0.1 and 1000 atm. and preferably 1 and 100 atm. Contact times will vary between 1 min. and several days, preferably between 0.2 and 24 hours. The reactants should be contacted in the liquid phase within an inert solvent, preferably an organic inert solvent, or the reacting olefin itself may be employed as solvent. Typical solvents which may be utilized are the $C_1$ to $C_{15}$ alkanes, $C_6$ to $C_{10}$ aryls, halogenated $C_1$ to $C_{10}$ alkanes, $C_6$ to $C_{15}$ haloaryls and certain haloalkenes. Specific examples of solvents include pentane, hexane, decane, benzene, xylene, carbon tetrachloride, methylene chloride, tetrachloroethylene, trichloroethylene, chlorobenzene. A wide range of ratios of reactants to catalysts may be employed. Ratios of reactants to catalysts from

SPECIFIC EMBODIMENTS

EXAMPLE 1.—Disproportionation of a linear terminal olefin with high olefin to catalyst ratio In a dried two ounce bottle 0.00005 mole of $(n\text{-}C_4H_9)_4N[Mo(CO)_5Cl]$, was contacted with 10 ml. chlorobenzene and 10 ml. pentene-1 at ambient conditions. To this mixture 0.4 ml. of 1.0 molar solution of methylaluminum dichloride in chlorobenzene was added in one portion and the reaction was allowed to proceed at atmospheric pressure at ambient temperature for 24 hours. A volatile gas was bubbled off during this time; at the end of 24 hours the mixture was stripped on a rotary evaporator under a 15 mm. vacuum. The products were collected by condensation in a trap cooled in a Dry Ice acetone bath and then analyzed by vapor phase chromatography. The analysis indicated that the product consisted of 46.4 mole percent pentene-1 and 53.6 percent of octene-4 on a solvent free basis.

EXAMPLE 2.—Use of the Br derivative rather than Cl

In this example an experiment identical to Example 1 with regard to process conditions was carried out except that the catalyst consisted of 0.0005 mole of

(n-$C_4H_9$)$_4$N[Mo(CO)$_5$Br]

and the activator was 4 ml. of a 1.0 molar solution of ethyl aluminum dichloride; reaction time was again 24 hours. The products recovered, by the technique defined in Example 1, consisted of 89.8 mole percent pentene-1, 0.7 percent pentene-2 and 9.5 percent octene-4 as determined by vapor phase chromatography.

EXAMPLE 3.—Use of Cr derivative rather than Mo

In this example an experiment identical to Example 1 was utilized except that the catalyst consisted of 0.0005 mole of (n-$C_4H_9$)$_4$N[Cr(CO)$_5$Cl] and the activator was 2 ml. of a 1.0 molar solution of methyl aluminum dichloride. The product recovered and identified as in Example 1 by vapor phase chromatography was 93.4 mole percent pentene-1, and 6.6 percent octene-4.

EXAMPLE 4.—Use of W derivatives

In this example an experiment identical to Example 1 was utilized except that the catalyst consisted of 0.0005 mole of (n-$C_4H_9$)$_4$N[W(CO)$_5$Cl] and the activator was 4 ml. of a 1.0 molar solution of methyl aluminum dichloride. The product after a period of 24 hours was determined by vapor phase chromatography to be 30.8 mole percent pentene-1, 0.3 percent heptene, and 68.9 percent octene-4 on a solvent free basis.

EXAMPLE 5.—Reaction carried out at elevated temperature

A heavy-walled glass reaction vessel fitted with a Teflon valve capable of withstanding elevated pressures was charged with 0.0005 mole (n-$C_4H_9$)$_4$N[Mo(CO)$_5$Br], 10 ml. chlorobenzene and 10 ml. pentene-1. A quantity of 1.0 molar solution of methylaluminum sesquichloride in chlorobenzene was added so that the eventual ratio of aluminum to molybdenum was 8:1. The valve was then closed and the reaction vessel was placed in an oil bath at 60° C. for four hours. The vessel was then removed from the bath and allowed to cool to room temperature over a period of one hour. The valve was then reopened to allow gaseous products to escape and the reaction mixture was stripped on a rotary evaporator under vacuum. The products were collected in a trap cooled to $-78°$ C. over a period of 0.2 hour; the products were analyzed by vapor phase chromatography and on a solvent-free basis consisted of 86.2 mole percent pentene-1, 5.0 percent pentene-2, and 8.8 percent octene-4.

EXAMPLE 6.—Addition of a Lewis base modifier

A two ounce bottle was charged with 0.0005 mole n-($C_4H_9$)$_4$N[Mo(CO)$_5$Br]

0.0005 mole triphenylphosphine, 10 ml. chlorobenzene, and 10 ml. pentene-1. Four ml. of a 1.0 molar solution of methylaluminum dichloride in chlorobenzene was then added. The reaction was allowed to proceed at ambient temperature and atomspheric pressure; any gaseous products were allowed to escape. After 24 hours the reaction mixture was stripped on a rotary evaporator under a 20 mm. vacuum. The products were collected in a trap at $-78°$ C. and atmospheric pressure. Analysis of the product by vapor phase chromatography indicated that the products consisted of 78.3 mole percent pentene-1, 14.9 percent pentene-2, and 6.8 percent octene-4 on a solvent free basis.

EXAMPLE 7.—Disproportionation of a cyclic olefin

A two ounce bottle was charged with 0.0005 mole

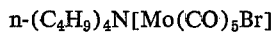
(n-$C_4H_9$)$_4$[M(CO)$_5$Br]

10 ml. chlorobenzene and 10 ml. cyclopentene. A sufficient amount of a 1.0 molar solution of methylaluminum sesquichloride in chlorbenzene was added so that the aluminum molybdenum ratio was 8:1. The reaction was allowed to proceed for 24 hours at ambient temperature and atmospheric pressure. The reaction mixture which had become very viscous was then stripped on a rotary evaporator, volatile products were collected in a trap at $-78°$ C. Approximately 6.4 grams of cyclopentene were recovered unchanged. Additionally, 1 gram of a tough rubbery polymer remained in the flask after the volatile materials had been removed.

EXAMPLE 8.—Disproportionation of a long chain terminal olefin

To a flask containing 0.0005 mole

(n-$C_4H_9$)$_4$N[Mo(CO)$_5$Cl]

10 g. eicosene-1, and 10 ml. chlorobenzene was added 4 ml. of a 1.0 molar solution of $CH_3AlCl_2$ in chlorobenzene. The mixture was heated in an oil bath at 50° for 24 hours. The mixture was then poured into 300 ml. methanol and the white solid which precipitated was collected by filtration and dried. Analysis of the product by gas phase chromatography showed approximately 25 mole percent eicosene-1 and 75 percent octatricontene-19.

EXAMPLE 9.—Disproportionation of an aryl substituted olefin

To a flask containing 0.0005 mole

(n-$C_4H_9$)$_4$N[Mo(CO)$_5$Cl]

10 ml. 4-phenylbutene-1 and 10 ml. chlorobenzene was added 4 ml. of a 1.0 molar solution of $CH_3AlCl_2$ in chlorobenzene. The mixture was allowed to stand at room temperature for 24 hours. The reaction was terminated by the addition of 5 ml. acetone. The resulting solution was analyzed by gas phase chromatography and was found to contain 35% 4-phenylbutene-1 and 65% 1,6-diphenylhexene-3 on a solvent free basis.

EXAMPLE 10.—Disproportionation of an internal linear olefin

To a two ounce bottle containing 0.0005 mole

(n-$C_4H_9$)$_4$N[Mo(CO)$_5$Cl]

10 ml. cis pentene-2 and 10 ml. chlorobenzene was added 4 ml. of a 1.0 molar solution of $CH_3AlCl_2$ in chlorobenzene. The solution was allowed to stand at room temperature for 24 hours. The mixture was then stripped on a rotary evaporator under 20 mm. vacuum. Analysis of the products by gas phase chromatography showed a composition of 19.1 mole percent butene-2, 48.8 percent pentene-2, 31.3 percent hexene-3 and 0.8 percent heptenes on a solvent free basis.

EXAMPLE 1.—Disproportionation of a branched olefin

An experiment similar to that described in Example 10 was carried out except that 10 ml. 3 methylbutene-1 was used as the reacting olefin. The products comprised of 80.7 mole percent 3-methylbutene-1 and 19.3 percent 2,5-dimethylhexene-3 on a solvent free basis as determined by gas phase chromatography.

EXAMPLE 12.—Disproportionation of a linear diolefin to form cyclic olefin product To a two ounce bottle containing 0.0005 mole

(n-$C_4H_9$)$_4$N[Mo(CO)$_5$]

10 ml 1,7-octadiene and 10 ml. chlorobenzene was added and 3 ml. of a 1.0 molar solution of $CH_3AlCl_2$ in chlorobenzene. The reaction was allowed to proceed at room temperature and atmospheric pressure for 24 hours. The mixture was then stripped on a rotary evaporator under 20 mm. vacuum and the products were analyzed by vapor phase chromatography. The product consisted of greater than 99 percent cyclohexene on a solvent free basis.

EXAMPLE 13

An experiment identical to that described in Example 12 was carried out with the exception that 10 ml. 1,4-pentadiene was employed as the reacting olefin. In this case the products as determined by vapor phase chromatography had the composition of 90.4 mole percent 1,4-pentadiene, 0.2 percent 1,4-cyclohexadiene and 9.4 percent 1,4,7-octatriene.

EXAMPLE 14.—Cross disproportionation

To a two ounce bottle containing 0.0005 mole (n-$C_4H_9$)$_4$N[Mo(CO)$_5$Cl], 10 ml. chlorobenzene, 5 ml. trans-2-butene and 5 ml. trans-4-octene was added 4 ml. of a 1 molar solution of $CH_3AlCl_2$ in chlorobenzene. The mixture was allowed to stand at room temperature and atmospheric pressure for 24 hours. The solution was then stripped on a rotary evaporator under 20 mm. vacuum. The product was analyzed by vapor phase chromatography and was found to contain 33.3 mole percent butene-2, 51.1 percent hexene-2, and 15.6 percent octene-4 on a solvent free basis.

EXAMPLE 15

An experiment identical to that described in Example 14 was carried out except that a mixture of 5 ml. vinyl cyclohexane and 5 ml. trans-2-butene was used as the reacting olefin mixture. The composition of the resulting product as determined by vapor phase chromatography was approximately 30 mole percent butene-2, 25 percent vinylcyclohexane and 44 percent 1-cyclohexylpropene on a solvent free basis.

EXAMPLE 16.—Reaction run without solvent

To a two ounce bottle containing 0.0010 mole (n-$C_4H_9$)$_4$N[Mo(CO)$_5$Cl] and 20 ml. pentene-1 was added 0.82 gram of liquid methylaluminum sesquichloride. The reaction was allowed to proceed at room temperature and atmospheric pressure for 3 hours. The mixture was then stripped on a rotary evaporator and the product was analyzed by gas phase chromatography. The composition of the product was 18.4 mole percent pentene-1, 0.2 percent hexene, 0.4 percent heptenes and 81.1 percent octene-4.

EXAMPLE 17.—Disproportionation of cyclic olefin to form polymer

To a bottle containing 0.0020 mole

(n-$C_4H_9$)$_4$N[Mo(CO)$_5$Cl]

40 ml. chlorobenzene and 40 ml. cyclooctene was added 8.0 ml. of a 1.0 molar solution of $CH_3AlCl_2$ in chlorobenzene. The mixture was stirred for 15 minutes then the resulting viscous solution was poured into 1000 ml. methanol. A white rubbery polymer precipitated which was collected on a filter, washed with an additional 500 ml. methanol and finally dried under high vacuum. The yield of dried polymer was 31.0 grams.

EXAMPLE 18.—Cross disproportionation of cyclic and linear olefin to form linear diolefin A mixture of 0.002 mole (n-$C_4H_9$)$_4$N[Mo(CO)$_5$Cl], 40 ml. chlorobenzene and 40 ml. cyclohexene was placed in a stainless steel autoclave then 16 ml. of a 1.0 molar solution of $CH_3AlCl_2$ was added under argon pressure. Ethylene gas was then introduced until the total pressure of ethylene was 800 p.s.i. The mixture was vigorously stirred under this pressure for 16 hours. The gas pressure was then released and the reaction mixture was stripped on a rotary evaporator under vacuum. The product was analyzed by vapor phase chromatography and was found to be 98.6 mole percent cyclohexene and 1.4 percent 1,7-octadiene on a solvent free basis.

What is claimed is:

1. A process for preparing a catalyst which consists essentially of contacting a metallic composition having the formula R[M(CO)$_5$X] wherein R is selected from the group consisting of alkali metal ions and cations of the type J$_4$Q wherein Q is selected from the group consisting of nitrogen, phosphorus and arsenic, and J is selected from the group consisting of hydrogen and $C_1$–$C_{30}$ hydrocarbyl radicals, M is a Group VI–B metal and X is a uninegatively charged ligand, selected from the group consisting of halide, cyanide, cyanate, thiocyanate, azide, acetate, trifluoroacetate and stearate, with an activator, said activator consisting essentially of compounds of the general formula AlY$_3$ wherein Y is a halide, at a temperature of about −100 to +150° C., and a pressure between 0.1 to 1000 atmospheres, whereby a catalyst is formed.

2. A process for preparing a catalyst which consists essentially of contacting a metallic composition having the formula R[M(CO)$_5$X] wherein R is selected from the group consisting of alkali metal ions and cations of the type J$_4$Q wherein Q is selected from the group consisting of nitrogen, phosphorous and arsenic, and J is selected from the group consisting of hydrogen and $C_1$–$C_{30}$ hydrocarbyl radicals, M is a Group VI–B metal and X is a uninegatively charged ligand, selected from the group consisting of halide, cyanide, cyanate, thiocyanate, azide, acetate, trifluoroacetate and stearate, with an activator, said activator consisting essentially of an organometallic compound, said organometallic compound selected from the group consisting of compounds having the general formula $r_nLY_m$ wherein r is independently selected from the group consisting of $C_1$ to $C_{30}$ hydrocarbyl radicals, L is selected from the group consisting of Group I–A, II–A and III–A metals, said metals having an atomic number of from 3 to 31, Y is a halide, n is an integer of from 1 to 3, and m is an integer of from 0 to 3, n and m having a total equal to the valence of L, at a temperature of from about −100 to +150° C. and a pressure of between 0.1 and 1000 atmospheres, the molar ratio of organometallic compound to metallic composition varying between 0.5:1 and 50:1, whereby a catalyst is formed.

3. The process of claim 2 wherein J is selected from the group consisting of phenyl and $C_1$ to $C_6$ alkyl radicals.

4. The process of claim 3 wherein the process takes place in an inert solvent.

5. The process of claim 3 wherein said uninegatively charged ligand is a halide.

6. The process of claim 3 wherein said halides are chlorides.

7. The process of claim 3 wherein the various J's are independently selected from the group consisting of $C_1$ to $C_6$ alkyl groups.

8. The process of claim 3 wherein r is selected from the group consisting of $C_1$ to $C_{12}$ alkyl radicals.

9. The process of claim 4 wherein said solvent is a $C_1$ to $C_{10}$ alkane.

10. The process of claim 4 wherein said solvent is halogenated.

11. The process of claim 3 wherein said contacting takes place at a temperature of 0 to 50° C., a pressure of 1 to 100 atmospheres for a period of 0.2 to 24 hours.

12. The process of claim 3 wherein the molar ratio of organometallic compound to metallic composition varies from 2:1 to 8:1.

13. The process of claim 3 wherein M is Mo.

14. The process of claim 3 wherein M is Cr.

15. The process of claim 3 wherein M is W.

16. The process of claim 3 wherein L is Al.

17. The process of claim 3 wherein said organometallic compound is methylaluminum dichloride.

18. The product of claim 4.

(References on following page)

References Cited

UNITED STATES PATENTS

| | | | |
|---|---|---|---|
| 3,530,196 | 9/1970 | Singleton | 252—429 R |
| 2,923,702 | 2/1960 | Lyons et al. | 252—429 A X |
| 2,951,066 | 8/1960 | Coover et al. | 252—431 N X |
| 3,081,287 | 3/1963 | Coover et al. | 252—429 B X |
| 3,463,827 | 8/1969 | Banks | 260—683 D X |
| 3,511,885 | 5/1970 | Hughes | 252—431 C X |

FOREIGN PATENTS

| | | | |
|---|---|---|---|
| 1,159,053 | 7/1969 | Great Britain | 252—443 |

PATRICK P. GARVIN, Primary Examiner

U.S. Cl. X.R.

252—428, 431 R, 431 C, 431 N, 431 P, 438, 441; 260—683 D